(12) United States Patent
Sara et al.

(10) Patent No.: US 10,078,589 B2
(45) Date of Patent: *Sep. 18, 2018

(54) ENFORCING DATA PROTECTION IN AN INTERCONNECT

(71) Applicant: ARM LIMITED, Cambridge (GB)

(72) Inventors: Daniel Sara, Sheffield (GB); Antony John Harris, Sheffield (GB); Håkan Lars-Göran Persson, Lund (SE); Andrew Christopher Rose, Cambridge (GB); Ian Bratt, San Jose, CA (US)

(73) Assignee: ARM Limited, Cambridge (GB)

( * ) Notice: Subject to any disclaimer, the term of this patent is extended or adjusted under 35 U.S.C. 154(b) by 296 days.

This patent is subject to a terminal disclaimer.

(21) Appl. No.: 14/700,259

(22) Filed: Apr. 30, 2015

(65) Prior Publication Data

US 2016/0321179 A1    Nov. 3, 2016

(51) Int. Cl.
*G06F 12/08* (2016.01)
*G06F 12/14* (2006.01)
*G06F 12/0831* (2016.01)

(52) U.S. Cl.
CPC ...... *G06F 12/0831* (2013.01); *G06F 12/0833* (2013.01); *G06F 12/1491* (2013.01); *G06F 2212/1052* (2013.01)

(58) Field of Classification Search
CPC ...... G06F 3/0604; G06F 3/064; G06F 3/0653; G06F 3/067; G06F 12/0828; G06F 12/0831; G06F 12/0623; G06F 12/0897; G06F 12/128; G06F 13/4221; G06F 13/4234; G06F 2212/621

USPC .......... 711/146, 154; 710/18, 52, 310, 243; 707/607, 703, 786; 712/225, 248

See application file for complete search history.

(56) References Cited

U.S. PATENT DOCUMENTS

| 5,909,698 | A  | * | 6/1999  | Arimilli | G06F 12/0808 |
|           |    |   |         |          | 711/141       |
| 6,209,064 | B1 |   | 3/2001  | Weber    |               |
| 6,490,642 | B1 | * | 12/2002 | Thekkath | G06F 13/364  |
|           |    |   |         |          | 710/108       |
| 6,611,900 | B2 | * | 8/2003  | Patel    | G06F 12/0831 |
|           |    |   |         |          | 711/145       |

(Continued)

OTHER PUBLICATIONS

Corrected UK Search Report dated Sep. 2, 2016 in GB 1604787.0, 5 pages.

*Primary Examiner* — Ann J Lo
*Assistant Examiner* — Michelle Taeuber
(74) *Attorney, Agent, or Firm* — Nixon & Vanderhye P.C.

(57) ABSTRACT

Interconnect circuitry and a method of operating the interconnect circuitry are provided, where the interconnect circuitry is suitable to couple at least two master devices to a memory, each comprising a local cache. Any access to the memory mediated by the interconnect circuitry is policed by a memory protection controller situated between the interconnect circuitry and the memory. The interconnect circuitry modifies a coherency type associated with a memory transaction received from one of the master devices to a type which ensures that when a modified version of a copy of a transaction target specified by the issuing master device is stored in a local cache of another master device an access to the transaction target in the memory must take place and therefore must be policed by the memory protection controller.

16 Claims, 3 Drawing Sheets

(56) References Cited

U.S. PATENT DOCUMENTS

| | | | |
|---|---|---|---|
| 6,681,283 B1* | 1/2004 | Thekkath | G06F 12/0815 710/305 |
| 9,311,244 B2 | 4/2016 | Salisbury et al. | |
| 2002/0147869 A1* | 10/2002 | Owen | H04L 1/1671 710/105 |
| 2006/0080508 A1* | 4/2006 | Hoover | G06F 12/0822 711/133 |
| 2006/0085602 A1* | 4/2006 | Huggahalli | G06F 9/345 711/137 |
| 2007/0083716 A1* | 4/2007 | Rajamony | G06F 12/0831 711/141 |
| 2007/0294481 A1* | 12/2007 | Hoover | G06F 12/0822 711/133 |
| 2008/0104332 A1* | 5/2008 | Gaither | G06F 12/0815 711/141 |
| 2008/0276018 A1* | 11/2008 | Hayter | G06F 13/387 710/62 |
| 2008/0294848 A1 | 11/2008 | Harris et al. | |
| 2012/0072675 A1* | 3/2012 | Moyer | G06F 9/3004 711/138 |
| 2014/0149687 A1 | 5/2014 | Moll et al. | |

\* cited by examiner

| COHERENCY TYPE | MODIFIED COHERENCY TYPE |
|---|---|
| READ_ONCE; READ_SHARED; READ_CLEAN; READ_NOT_SHARED_DIRTY; CLEAN_SHARED | CLEAN_SHARED |
| READ_UNIQUE; CLEAN_INVALID; MAKE_INVALID | CLEAN_INVALID |

ENFORCING DATA PROTECTION IN AN INTERCONNECT

BACKGROUND

The present disclosure relates to interconnect circuitry. More particularly it relates to enforcing data protection in interconnect circuitry.

It is known to provide interconnect circuitry which connects a number of master devices to a memory, such that when one of those master devices seeks access to a data item stored in the memory, the memory transaction is mediated by the interconnect circuitry, and if a data item is returned from the memory in response, this is also mediated by the interconnect circuitry. It is further known to provide the interconnect circuitry with the ability to implement a cache coherency protocol, wherein when the master devices have their own local caches, the interconnect circuitry can respond to a memory transaction received from one master device to snoop the content of local caches belonging to other master devices to determine if a local copy of the target data item (which is the subject of the memory transaction) is currently stored in one of those other local caches. If it is the interconnect can provide that local copy in response to the memory transaction, it can initiate a required update to that local copy and/or the original target data item in the memory as necessary, and so on, in order to maintain correct coherency within the system. It is also known that when a master device issues a memory transaction, which is then received by the interconnect circuitry, the memory transaction may specify a coherency type which is indicative of a type of coherency response which the interconnect circuitry should carry out, such that a copy of the target data item in another master's local cache, and the original copy thereof in memory, are left in a desired state for the purposes of the master device which issued the memory transaction once the interconnect circuitry has carried out the appropriate coherency response.

SUMMARY

Viewed from a first aspect the present techniques provide interconnect circuitry comprising: transaction coherency circuitry responsive to a memory transaction received from a first master device, wherein the memory transaction specifies a transaction target in a memory and a coherency type, to cause a snoop access to be transmitted to a cache of a second master device in dependence on the coherency type and, when a memory accessing transaction is received from the second master device in order to maintain coherency of a copy of the transaction target in the cache, to transmit the memory accessing transaction to a memory protection controller which is arranged to police access to the memory; and transaction monitoring circuitry responsive to reception of the memory transaction from the first master to modify the coherency type to a memory accessing coherency type, wherein the transaction coherency circuitry is responsive to the memory accessing coherency type to initiate an access to the transaction target in the memory when a modified version of the copy of the transaction target is in the cache.

Viewed from a second aspect the present techniques provide a data processing system comprising a first master device and a second master device, wherein the first master device comprises a first cache and the second master device comprises a second cache; a memory; a memory protection controller to police access to the memory; and interconnect circuitry according to the above-mentioned first aspect.

Viewed from a third aspect the present techniques provide interconnect circuitry comprising: means for causing, in response to a memory transaction issued by a first master device, wherein the memory transaction specifies a transaction target in a memory and a coherency type, a snoop access to be transmitted to a cache of a second master device in dependence on the coherency type; means for transmitting, when a memory accessing transaction is received from the second master device in order to maintain coherency of a copy of the transaction target in the cache, the memory accessing transaction to a memory protection controller which is arranged to police access to the memory; means for modifying, in response to receiving the memory transaction from the first master, the coherency type to a memory accessing coherency type; and means for initiating, in response to the memory accessing coherency type, an access to the transaction target in the memory when a modified version of the copy of the transaction target is in the cache.

Viewed from a fourth aspect the present techniques provide a method of operating an interconnect comprising: causing, in response to a memory transaction issued by a first master device, wherein the memory transaction specifies a transaction target in a memory and a coherency type, a snoop access to be transmitted to a cache of a second master device in dependence on the coherency type; transmitting, when a memory accessing transaction is received from the second master device in order to maintain coherency of a copy of the transaction target in the cache, the memory accessing transaction to a memory protection controller which is arranged to police access to the memory; modifying, in response to receiving the memory transaction from the first master, the coherency type to a memory accessing coherency type; and initiating, in response to the memory accessing coherency type, an access to the transaction target in the memory when a modified version of the copy of the transaction target is in the cache.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
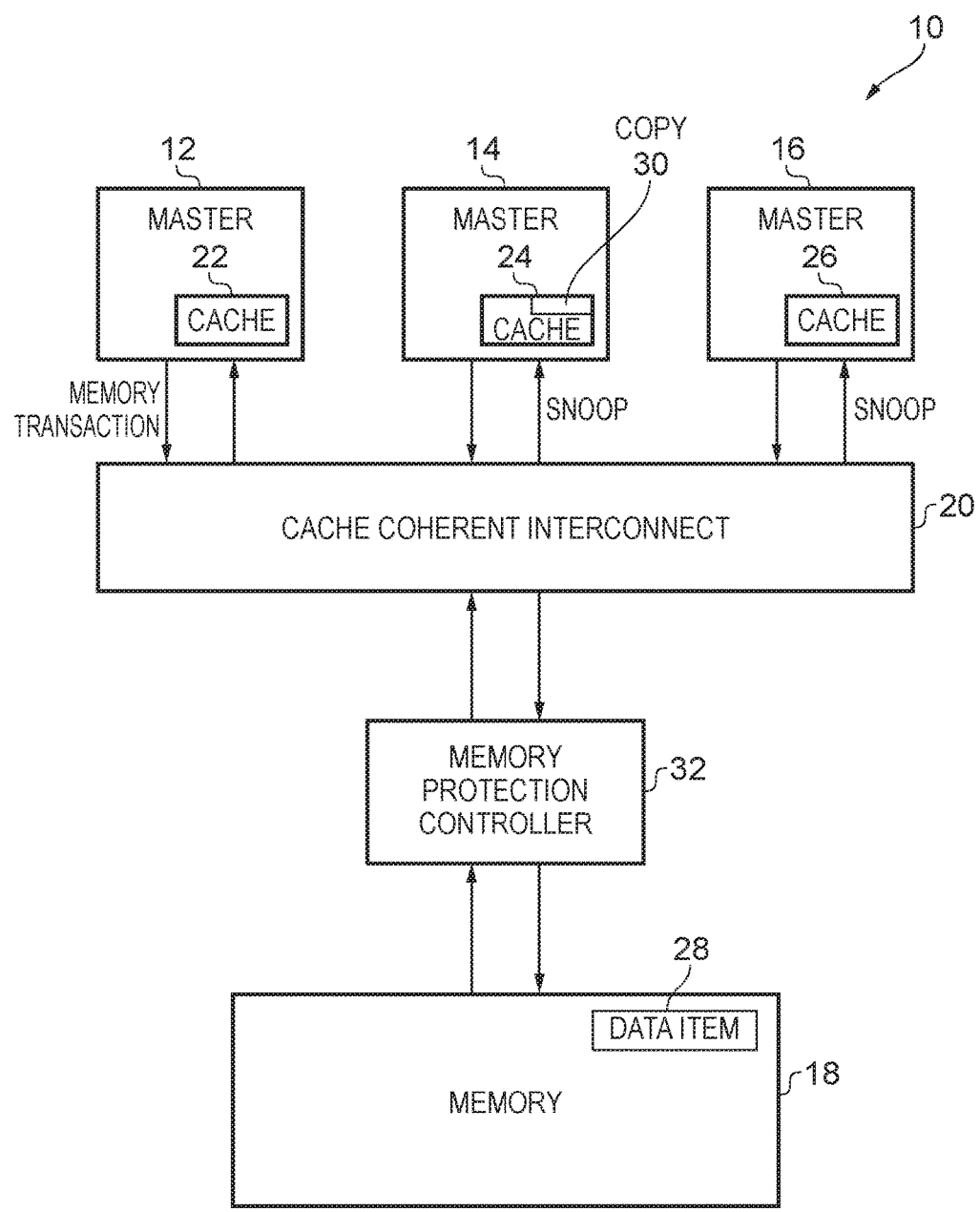
FIG. 1 schematically illustrates a data processing system in one embodiment.

At least some embodiments provide interconnect circuitry comprising: transaction coherency circuitry responsive to a memory transaction received from a first master device, wherein the memory transaction specifies a transaction target in a memory and a coherency type, to cause a snoop access to be transmitted to a cache of a second master device in dependence on the coherency type and, when a memory accessing transaction is received from the second master device in order to maintain coherency of a copy of the transaction target in the cache, to transmit the memory accessing transaction to a memory protection controller which is arranged to police access to the memory; and transaction monitoring circuitry responsive to reception of the memory transaction from the first master to modify the coherency type to a memory accessing coherency type, wherein the transaction coherency circuitry is responsive to the memory accessing coherency type to initiate an access to the transaction target in the memory when a modified version of the copy of the transaction target is in the cache.

The present techniques recognise that data processing systems comprising known interconnect circuitry may face a security vulnerability despite a data security enforcing mechanism being provided such as a memory protection controller interposed between the interconnect circuitry and the memory. The memory protection controller filters all memory transactions which are mediated by the interconnect circuitry and forwarded towards the memory, rejecting memory transactions which seek access to a transaction target in the memory to which the master device which issued the memory transaction is not allowed access. The memory protection controller may take a variety of forms, but in some embodiments is a TrustZone Controller (TZC) as provided by ARM Limited, Cambridge. UK. Similarly, the interconnect circuitry may take a variety of forms, but in some embodiments is provided by a Cache Coherent Interconnect operating in in accordance with the AMBA 4 ACE and/or ACE-Lite protocols specified by ARM Limited, Cambridge, UK.

The present techniques recognise that despite the provision of the memory protection controller between the interconnect circuitry and the memory, the fact that cache coherency is supported by the interconnect circuitry could result in a data item being transferred between local caches of the master devices in the data processing system without passing through the memory protection controller. The security protection provided by the memory protection controller is thus not invoked by these inter-cache data transfers and as a result a security vulnerability may result which might be exploited. For example, the following attack vectors would be possible in this situation. Firstly, a non-protected (non-secure) master device could read protected (secure) data from the local cache of another master device (where it may have been protected). Second, a non-protected master could invalidate protected data in the local cache of another master device (where it may have been protected). Thirdly, a protected master could read data from a local cache of another master device, where that data may have been created by a non-protected thread or a thread with a different protection level. Whilst one approach to this problem would be simply to disable the cache coherency protocol, this could have significant negative implications in terms of both performance and software complexity.

The present techniques both recognise and address this problem. According to the present techniques transaction monitoring circuitry is provided in the interconnect circuitry which is responsive to the reception of a memory transaction issued by one of the master devices in the data processing system, and in particular to identify a coherency type specified in that memory transaction, and to modify the coherency type into one (a "memory accessing coherency type") which will ensure that all transactions carried out as a result must necessarily pass through the memory protection controller in order to be successfully completed. The protection afforded by the provision of the memory protection controller is thus guaranteed to be applied, even in situations of inter-cache data transfer, which might otherwise bypass the memory protection controller.

Thus on the one hand when snooping of the local cache of a second master device results in a memory transaction being issued by that second master device, it is ensured that this memory transaction is policed by the memory protection controller. On the other hand, for the original memory transaction issued by the first master device, it is also ensured that this memory transaction itself is also policed by the memory protection controller. The above described security vulnerabilities thus cannot take place when using the interconnect circuitry of the present techniques.

In some embodiments, the transaction coherency circuitry is responsive to an indication that the snoop access to the second has completed to initiate a further access to the transaction target in the memory by forwarding the memory transaction to the memory protection controller. In other words, when a memory transaction is received from the first master device, which results in a snoop access to another local cache belonging to another master device, the interconnect circuitry ensures that the memory transaction issued by the first master device is held up in the interconnect circuitry until it receives an indication from the second master device that the snoop access to the cache (including any resulting memory access) has completed. This dependence thus supports the provision of a correct version of the target data item to the first master device (where requested) and provides that the first master device cannot receive a response to its issued memory transaction until the snoop access has completed, thus further supporting the present security enhancing techniques.

The particular manner in which the transaction coherency circuitry responds to the memory accessing coherency type to initiate the access to the transaction target in memory if a modified version (e.g. labelled "dirty") of the copy of the transaction target is in the (second master's) cache may take a variety of forms, but in some embodiments the transaction coherency circuitry has structure to initiate the access to the transaction target in memory by initiating a cleaning access to the second cache. Such a cleaning access thus ensures that the modified version of the copy of the transaction target stored in the cache must be propagated out to the memory in order to update the transaction target and thus necessarily also being policed by the memory protection controller.

In some embodiments the transaction coherency circuitry does not forward the memory transaction issued by the first master device to the memory protection controller until it receives an indication that the snoop access to the cache (including any memory accessing transaction triggered by that snoop access) has completed. In some embodiments in order to support this functionality the transaction coherency circuitry has a buffer to hold the memory transaction until it receives an indication that the access to the transaction target in memory initiated by the second cache has completed.

In some embodiments the memory accessing coherency type is indicative that the access to the transaction target in memory must update the transaction target in memory in dependence on the copy of the transaction target in the cache. This memory accessing coherency type may take a variety of forms, but in some embodiments, for example those implementing the above mentioned ACE-based interconnect circuitry, this memory accessing coherency type is one of the ACSNOOP values beginning with the label "clean".

The coherency type may indicate a number of different coherency maintenance outcomes which the issuing master device has specified in association with the issued memory transaction. In some embodiments the coherency type is indicative that the access to the transaction target in the memory is a read access. It may instead be a write access.

It may, alternatively or in addition, be an invalidation access to the copy of the transaction target in the cache.

In some embodiments the memory accessing coherency type is indicative that the snoop access to the cache must invalidate the copy of the transaction target in the cache. For example in some embodiments which implement the above mentioned ACE-based interconnect, the memory access and coherency type may be the ACSNOOP value "CleanInvalid".

Although the implementation of the present techniques ensures that the required security considerations in a data processing system are respected, even when direct data access between local caches of multiple master devices is supported by the interconnect circuitry, the present techniques further recognise that the above described approaches necessarily have some performance impact. In this context the present techniques further recognise that there may be specific situations in which the application of these techniques can safely be suppressed. In particular, it is recognised that with knowledge of the configuration of the second master (e.g. the type of software threads which it hosts), a security level associated with the memory transaction (e.g. derived from the thread which caused the memory transaction to be issued by the first master device) and/or a master identifier specified in the memory transaction (i.e. indicating the master device which issued the memory transaction), it may be possible safely to prevent the transaction monitoring circuitry from modifying the coherency type.

Thus in some embodiments the interconnect circuitry further comprises coherency modification override circuitry to prevent the transaction monitoring circuitry from modifying the coherency type in dependence on a known configuration of the second master device. The coherency modification override circuitry may be arranged to prevent the transaction monitoring circuitry from modifying the coherency type in dependence on a security level associated with the memory transaction. The coherency modification override circuitry may be arranged to prevent the transaction monitoring circuitry from modifying the coherency type in dependence on a master identifier specified in the memory transaction. For example, if the thread which caused the memory transaction to be issued is known to be non-protected (e.g. at a lowest security level supported in the data processing system, for example NSAID=0 in embodiments implementing the above mentioned ACE-based interconnect) and the master device being snooped is known not to host protected threads, direct data transfer between the respective caches can be allowed to proceed without coherency type modification. Nevertheless, it is important to note that if either the thread which caused the memory transaction to be issued is protected or the snooped master device hosts protected threads, then the coherency type modification must be allowed to proceed in order to guarantee the required security.

At least some embodiments provide a data processing system comprising a first master device and a second master device, wherein the first master device comprises a first cache and the second master device comprises a second cache; a memory; a memory protection controller to police access to the memory; and the interconnect circuitry of any of the embodiments discussed above or combinations thereof.

The memory protection controller may police access to the memory in a variety of ways, but in some embodiments the memory protection controller is arranged to reject a memory transaction seeking to access the memory when at least one attribute of the memory transaction is indicative that a source of the memory transaction is not allowed to access the transaction target in memory specified by the memory transaction.

At least some embodiments provide interconnect circuitry comprising: means for causing, in response to a memory transaction issued by a first master device, wherein the memory transaction specifies a transaction target in a memory and a coherency type, a snoop access to be transmitted to a cache of a second master device in dependence on the coherency type; means for transmitting, when a memory accessing transaction is received from the second master device in order to maintain coherency of a copy of the transaction target in the cache, the memory accessing transaction to a memory protection controller which is arranged to police access to the memory; means for modifying, in response to receiving the memory transaction from the first master, the coherency type to a memory accessing coherency type; and means for initiating, in response to the memory accessing coherency type, an access to the transaction target in the memory when a modified version of the copy of the transaction target is in the cache.

At least some embodiments provide a method of operating an interconnect comprising: causing, in response to a memory transaction issued by a first master device, wherein the memory transaction specifies a transaction target in a memory and a coherency type, a snoop access to be transmitted to a cache of a second master device in dependence on the coherency type; transmitting, when a memory accessing transaction is received from the second master device in order to maintain coherency of a copy of the transaction target in the cache, the memory accessing transaction to a memory protection controller which is arranged to police access to the memory; modifying, in response to receiving the memory transaction from the first master, the coherency type to a memory accessing coherency type; and initiating, in response to the memory accessing coherency type, an access to the transaction target in the memory when a modified version of the copy of the transaction target is in the cache.

FIG. 1 schematically illustrates a data processing system in one embodiment. The data processing system comprises three master devices 12, 14 and 16 which perform data processing operations with respect to data items stored in memory 18. Access between one of the master devices and the memory 18 is mediated by the cache coherent interconnect 20. This interconnect circuitry, being "cache coherent", is responsive to a memory transaction received from one master device to snoop the other master devices in the data processing apparatus and in particular to cause examination of the content of their respective local caches, to determine if a copy of the transaction target of the memory transaction is currently stored in one of those local caches. As shown in FIG. 1, each master device comprises its own local cache 22, 24 and 26 respectively. FIG. 1 schematically illustrates a situation in which a memory transaction is issued by the master device 12 which specifies the data item 28 stored in memory 18 as its transaction target, and where a local copy 30 of that data item is currently stored in cache 24 of master device 14.

The data processing system 10 further comprises a memory protection controller 32 which polices any memory transaction received from the cache coherent interconnect 20 seeking access to a transaction target in the memory 18, and blocks any unauthorised access, i.e. where the memory transaction indicates that it has been issued by a source which is not allowed access to the specified transaction target. In the illustrated example the data processing system 10 implements TrustZone Media Protection (TZMP) and the cache coherent interconnect 20 is arranged to operate in accordance with the ACE protocol, each as specified by ARM Limited, Cambridge. UK. However, as an extension to the known configuration of such a cache coherent interconnect, the cache coherent interconnect 20 in the example of FIG. 1, operating in accordance with the present techniques, ensures that all memory transactions pass through the memory protection controller 32 for both read and write accesses by performing a snoop type modification, which is described in more detail below.

Figures 2A, 2B:
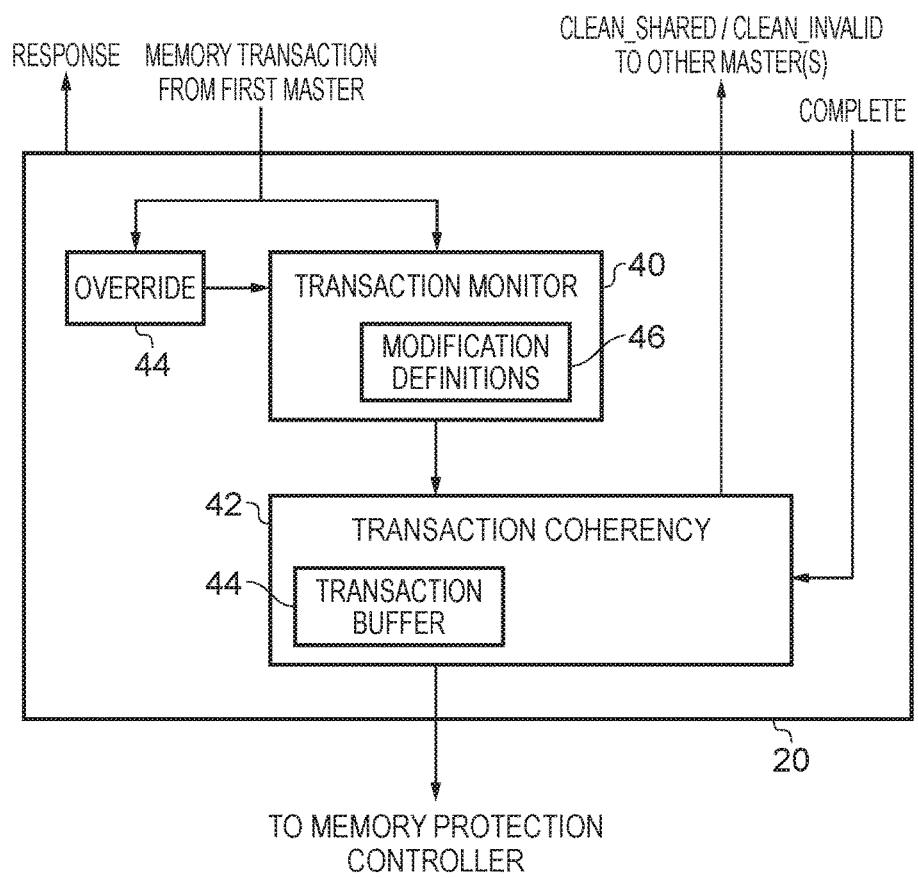
FIG. 2A schematically illustrates in more detail the cache coherent interconnect shown in FIG. 1 in one embodiment.
FIG. 2B shows example modification definitions for coherency types used by the transaction monitor of the cache coherent interconnect of FIG. 2A in one embodiment.

FIG. 2A schematically illustrates in more detail the cache coherent interconnect 20 shown in FIG. 1. The cache coherent interconnect 20 comprises transaction monitor 40 and transaction coherency unit 42. It further comprises override unit 44. A memory transaction received from a master device in the data processing system (e.g. from master device 12) is received by both the transaction monitor 40 and the override circuitry 44. The transaction monitor 40 has the particular function here to identify a coherency type defined in the memory transaction and (in dependence on the modification definitions 46 which it holds), may modify the coherency type into a memory accessing coherency type. The memory transaction (incorporating the possibly modified coherency type) is passed to the transaction coherency unit 42. An example set of coherency type conversions which are held as the modification definitions 46 in the transaction monitor 40 are set out in FIG. 2B. Notice that in the modification definitions given in FIG. 2B all modified coherency types specify "Clean", meaning that any snoop actions implemented by the cache coherent interconnect 20 thereafter necessarily result in a cleaning transaction with respect to any modified (e.g. labelled "dirty") copies of data items found in local caches in the data processing system which are the subject of that snoop. This cleaning transaction will thus necessarily comprise attempting to access the corresponding version of the data item stored in memory 18 and will therefore necessarily encounter the memory protection controller 32.

Considering a couple of examples of the coherency types specified in FIG. 2B, note that the response required by the issuing master device to a memory transaction specifying the coherency type READ_ONCE is that if a copy of the target data item is held by another master's local cache it is read and returned to the issuing master device, whereas following the coherency type modification (to CLEAN_SHARED) this still allows the other master device to keep a copy in its local cache, but any modifications have to be propagated out to memory. In the example of a memory transaction specifying the READ_UNIQUE coherency type this indicates that the issuing master device requires the data item to be read and to be de-allocated from (invalidated in) another master device's local cache in which it is found. Where the result of a snoop access in accordance with READ_UNIQUE would just invalidate the data item in the other cache, this is not allowed according to the present techniques (which modify the coherency type to CLEAN_INVALID) since this invalidation of the copy stored in the other cache may in fact not be appropriate according to the security definitions of the data processing system. The present techniques ensure that the propagation of a memory transaction via the memory protection controller for the snoop access is carried out in the response to the CLEAN_INVALID coherency type and hence that such an inappropriate invalidation cannot occur.

The transaction coherency unit 42 comprises a transaction buffer 44 which temporarily holds memory transactions received by the cache coherent interconnect 20 whilst the transaction coherency unit 42 carries out any required snoop operation. In particular, following the modification of the coherency type carried out by the transaction monitor 40 in accordance with the definitions set out in FIG. 2B the snoop access made to other master devices in the data processing system will then be made according to the coherency types CLEAN_SHARED or CLEAN_INVALID. The transaction coherency unit 42 then waits until it receives a corresponding "complete" signal from any master devices which have been the subject of this snoop access. As a result of receiving this snoop access the cache of another master device in the system which is holding a copy of the specified data item will initiate a memory transaction of its own in order to write back its copy of that data item (and, if the snoop access is of the CLEAN_INVALID type, will then mark its local copy as invalid). This memory transaction (for the write back) issued by another master device in the system is then itself mediated by the cache coherent interconnect 20, although being a write back will not trigger the same snooping mechanisms within the cache coherent interconnect, and is forwarded towards the memory 18 via the memory protection controller 32, thus ensuring that this memory transaction is in accordance with the security definitions within the data processing system. Once an indication is received by the issuing master device that this write back memory transaction has completed, it signals to the transaction coherency unit 42 that the snoop access is now complete. In response, the transaction coherency unit 42 then releases the memory transaction buffered in the transaction buffer 44. If this memory transaction itself required access to the memory it is forwarded to the memory protection controller 32 to be passed on to the memory 18 if it is in accordance with the security definitions of the data processing system, thus ensuring that those security definitions are also respected for this memory transaction. If the memory transaction itself does not require access to the memory (as is, for example, the case for CLEAN_SHARED. MAKE_INVALID and CLEAN_INVALID labelled transactions), then the release of the memory transaction from the transaction buffer 44 then allows the cache coherent interconnect 20 to signal completion of this memory transaction to its issuing master.

It is worthwhile to note that the memory transaction received from the first master may specify a coherency type which is not listed in the example modification definitions shown in FIG. 2B, because the memory transaction may not only specify a read access or an invalidation access, but it may also specify a write access. However, the coherency types associated with write accesses, such as WRITE_UNIQUE and WRITE_LINE_UNIQUE are separately modified by the snooping functionality of the cache coherent interconnect 20 to become the coherency types CLEAN_INVALID and MAKE_INVALID respectively. These latter coherency types are to be found in the examples shown in FIG. 2B, where it can be seen that the reception of either by the transaction monitor 40 results in a modified coherency type of CLEAN_INVALID. It will therefore be understood that this aspect of the snoop functionality provided by the cache coherency interconnect 20 (for a write access) takes place in the transaction monitor 40 before the modifications. Thus, previously a memory transaction specifying the coherency types WRITE_UNIQUE or WRITE_LINE_UNIQUE would have resulted in either a CLEAN_INVALID snoop or a MAKE_INVALID snoop respectively before the required write was performed. Now the present techniques provide that a CLEAN_INVALID type snoop is performed first, thus also ensuring that the security definitions in the data processing system are respected for these write access memory transactions.

Finally, recall that the override unit 44 also receives the memory transaction issued by the first master device. Where the override unit 44 identifies that the memory transaction cannot pose a potential security violation, because of the security level associated with the memory transaction (e.g. NSAID value), the known configuration of the other master devices in the data processing system, e.g. that they do not host any protected threads, and/or the particular master device from which this memory transaction has been received (e.g. as specified in a master identifier in the memory transaction) the override unit 44 signals to the transactions monitor 40 that it should not perform a coherency type modification for this transaction. For example if the thread which caused the memory transaction to be issued is known to be non-protected and the master device to be snooped unknown not to host protected threads, then the access can be allowed to use direct data transfer without any snoop type modification occurring.

Figure 3:
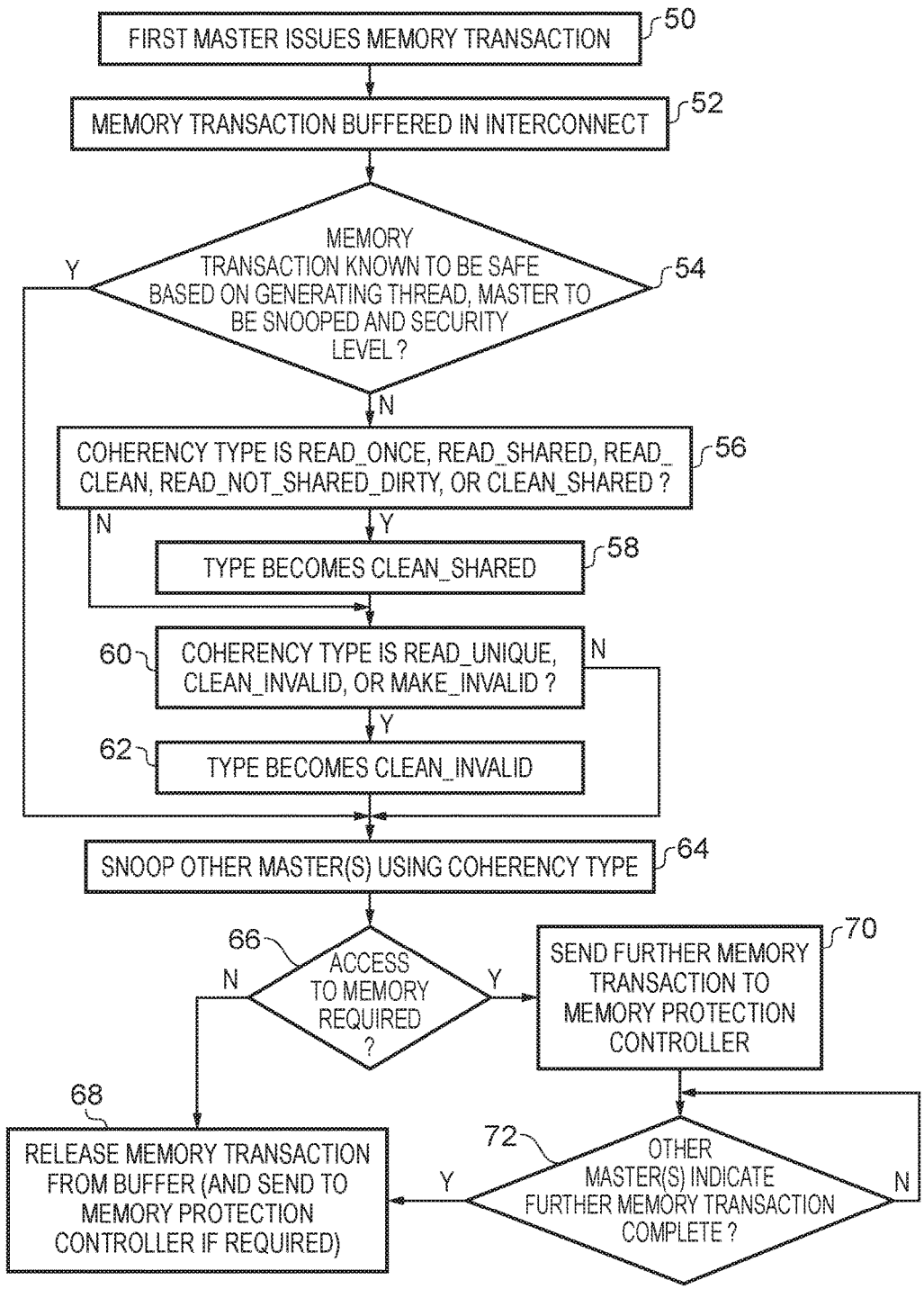
FIG. 3 shows a sequence of steps which are carried out when operating a cache coherent interconnect in one embodiment.

FIG. 3 shows a sequence of steps which are taken according to one embodiment of the present techniques when operating a cache coherency interconnect such as that shown in the examples of FIGS. 1 and 2A. The flow begins at step 50 where a first master device issues a memory transaction. Then at step 52 the memory transaction is buffered in the interconnect. At step 54 it is determined if the memory transaction is known to be safe based on the generated thread, the master to be snooped and a security level associated with the memory transaction (e.g. specified as a NSAID value). If the memory transaction is found not be guaranteed to be safe based on these criteria, then the flow proceeds to step 56 where it is determined if the coherency type specified in association with the memory transaction is READ_ONCE, READ_SHARED, READ_CLEAN, READ_NOT_SHARED_DIRTY, or CLEAN_SHARED. If it is one of these coherency types then the flow proceeds via step 58 where this type is modified to becomes CLEAN_SHARED. At step 60 it is determined if the coherency type associated with the received memory transaction is READ_UNIQUE, CLEAN_INVALID or MAKE_INVALID. If it is then the flow proceeds via step 62 where the coherency step is modified to become CLEAN_INVALID. Then at step 64 the cache coherency interconnect performs snoops to other master devices in the system using the (possibly modified) coherency type. At step 66 it is determined if an access to memory is required as a result of this snoop, and if it is not the flow proceeds to step 68, where the buffered memory transaction is released and if necessary is sent to the memory protection controller (noting that some memory transactions received from a master device, such as those labelled CLEAN_INVALID, do not require data to be returned to that master device and hence these memory transactions do not themselves require passing to the memory protection controller). Returning to a consideration of step 54, if it is found there that a memory transaction is indeed known to be safe then the flow proceeds directly to step 64. If, at step 66, it is determined that an access to memory is required as a result of the snoop operation, then the flow proceeds via step 70 where a further memory transaction to implement that required memory access is sent by the cache coherent interconnect to the memory protection controller (and then on to the memory if allowed by the memory protection controller). The flow waits at step 72 until the other master(s) in the system indicate that their respective memory transactions initiated as a result of a snoop that they have received have completed and when this is true, the flow then proceeds to step 68 (as described above).

In brief overall summary, interconnect circuitry and a method of operating the interconnect circuitry are provided, where the interconnect circuitry is suitable to couple at least two master devices to a memory, each comprising a local cache. Any access to the memory mediated by the interconnect circuitry is policed by a memory protection controller situated between the interconnect circuitry and the memory. The interconnect circuitry modifies a coherency type associated with a memory transaction received from one of the master devices to a type which ensures that when a modified version of a copy of a transaction target specified by the issuing master device is stored in a local cache of another master device an access to the transaction target in the memory must take place and therefore must be policed by the memory protection controller.

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" and "arranged to" do not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. Interconnect circuitry comprising:
transaction coherency circuitry responsive to a memory transaction received from a first master device, wherein the memory transaction specifies a transaction target in a memory and a coherency type, to cause a snoop access to be transmitted to a cache of a second master device in dependence on the coherency type and, when a memory accessing transaction is received from the second master device in order to maintain coherency of a copy of the transaction target in the cache, to transmit the memory accessing transaction to a memory protection controller which is arranged to police access to the memory; and
transaction monitoring circuitry responsive to reception of the memory transaction from the first master to modify the coherency type to a memory accessing coherency type, wherein the transaction coherency circuitry is responsive to the memory accessing coherency type to initiate an access to the transaction target in the memory when a modified version of the copy of the transaction target is in the cache.
2. Interconnect circuitry as claimed in claim 1, wherein the transaction coherency circuitry is responsive to an indication that the snoop access to the second master device has completed to initiate a further access to the transaction target in the memory by forwarding the memory transaction to the memory protection controller.

3. Interconnect circuitry as claimed in claim 1, wherein the transaction coherency circuitry is arranged to initiate the access to the transaction target in memory by initiating a cleaning access to the cache.

4. Interconnect circuitry as claimed in claim 1, wherein the transaction coherency circuitry comprises a buffer to hold the memory transaction until it receives an indication that the access to the transaction target in memory has completed.

5. Interconnect circuitry as claimed in claim 1, wherein the memory accessing coherency type is indicative that the access to the transaction target in memory must update the transaction target in memory in dependence on the copy of the transaction target in the cache.

6. Interconnect circuitry as claimed in claim 1, wherein the coherency type is indicative that the access to the transaction target in the memory is a read access.

7. Interconnect circuitry as claimed in claim 1, wherein the coherency type is indicative that the access to the transaction target in the memory is a write access.

8. Interconnect circuitry as claimed in claim 1, wherein the coherency type is indicative that the snoop access to the cache must invalidate the copy of the transaction target in the cache.

9. Interconnect circuitry as claimed in claim 1, wherein the memory accessing coherency type is indicative that the snoop access to the cache must invalidate the copy of the transaction target in the cache.

10. Interconnect circuitry as claimed in claim 1, wherein the interconnect circuitry further comprises coherency modification override circuitry to prevent the transaction monitoring circuitry from modifying the coherency type in dependence on a known configuration of the second master device.

11. Interconnect circuitry as claimed in claim 10, wherein the coherency modification override circuitry is arranged to prevent the transaction monitoring circuitry from modifying the coherency type in dependence on a security level associated with the memory transaction.

12. Interconnect circuitry as claimed in claim 10, wherein the coherency modification override circuitry is arranged to prevent the transaction monitoring circuitry from modifying the coherency type in dependence on a master identifier specified in the memory transaction.

13. A data processing system comprising: a first master device and a second master device, wherein the first master device comprises a first-master-device cache and the second master device comprises a second-master-device cache;
a memory;
a memory protection controller to police access to the memory;
and an interconnect circuitry comprising: transaction coherency circuitry responsive to a memory transaction received from the first master device, wherein the memory transaction specifies a transaction target in the memory and a coherency type, to cause a snoop access to be transmitted to the second-master-device cache in dependence on the coherency type and, when a memory accessing transaction is received from the second master device in order to maintain coherency of a copy of the transaction target in the second-master-device cache, to transmit the memory accessing transaction to the memory protection controller which is arranged to police access to the memory; and
transaction monitoring circuitry responsive to reception of the memory transaction from the first master to modify the coherency type to a memory accessing coherency type, wherein the transaction coherency circuitry is responsive to the memory accessing coherency type to initiate an access to the transaction target in the memory when a modified version of the copy of the transaction target is in the second-master-device cache.

14. The data processing system as claimed in claim 13, wherein the memory protection controller is responsive to a memory transaction seeking to access the memory to reject the memory transaction when at least one attribute of the memory transaction is indicative that a source of the memory transaction is not allowed to access the transaction target in the memory specified by the memory transaction.

15. Interconnect circuitry comprising:
means for causing, in response to a memory transaction issued by a first master device, wherein the memory transaction specifies a transaction target in a memory and a coherency type, a snoop access to be transmitted to a cache of a second master device in dependence on the coherency type;
means for transmitting, when a memory accessing transaction is received from the second master device in order to maintain coherency of a copy of the transaction target in the cache, the memory accessing transaction to a memory protection controller which is arranged to police access to the memory;
means for modifying, in response to receiving the memory transaction from the first master, the coherency type to a memory accessing coherency type; and
means for initiating, in response to the memory accessing coherency type, an access to the transaction target in the memory when a modified version of the copy of the transaction target is in the cache.

16. A method of operating an interconnect comprising:
causing, in response to a memory transaction issued by a first master device, wherein the memory transaction specifies a transaction target in a memory and a coherency type, a snoop access to be transmitted to a cache of a second master device in dependence on the coherency type;
transmitting, when a memory accessing transaction is received from the second master device in order to maintain coherency of a copy of the transaction target in the cache, the memory accessing transaction to a memory protection controller which is arranged to police access to the memory;
modifying, in response to receiving the memory transaction from the first master, the coherency type to a memory accessing coherency type; and
initiating, in response to the memory accessing coherency type, an access to the transaction target in the memory when a modified version of the copy of the transaction target is in the cache.

* * * * *